US010809798B2

(12) United States Patent
Moravetz

(10) Patent No.: US 10,809,798 B2
(45) Date of Patent: *Oct. 20, 2020

(54) MENU NAVIGATION IN A HEAD-MOUNTED DISPLAY

(71) Applicant: SONY INTERACTIVE ENTERTAINMENT LLC, San Mateo, CA (US)

(72) Inventor: Justin Moravetz, Foster City, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 279 days.

This patent is subject to a terminal disclaimer.

(21) Appl. No.: 15/447,342

(22) Filed: Mar. 2, 2017

(65) Prior Publication Data

US 2017/0242479 A1    Aug. 24, 2017

Related U.S. Application Data

(63) Continuation of application No. 14/283,032, filed on May 20, 2014, now Pat. No. 9,588,343.

(Continued)

(51) Int. Cl.
*G06F 3/0481* (2013.01)
*G06F 3/01* (2006.01)
(Continued)

(52) U.S. Cl.
CPC ............ *G06F 3/013* (2013.01); *G02B 27/017* (2013.01); *G02B 27/0172* (2013.01);
(Continued)

(58) Field of Classification Search
CPC ...... G06F 3/0482; G06F 3/013; G06F 3/0481; G02B 27/017; G02B 27/0172
See application file for complete search history.

(56) References Cited

U.S. PATENT DOCUMENTS 5,258,785 A * 11/1993 Dawkins, Jr. ........... A61F 9/029
351/43
5,585,871 A * 12/1996 Linden ............... A63B 71/0686
351/158

(Continued)

FOREIGN PATENT DOCUMENTS

CN   101 098 491 A    1/2008
CN   106 471 420 B    4/2019
(Continued)

OTHER PUBLICATIONS

U.S. Appl. No. 14/460,273 Office Action dated May 10, 2017.
(Continued)

*Primary Examiner* — Phenuel S Salomon
(74) *Attorney, Agent, or Firm* — Polsinelli LLP

(57) ABSTRACT

A wearable computing device includes a head-mounted display (HMD) that generates a virtual reality environment. Through the generation and tracking of positional data, a focal point may be tracked with respect to one or menu navigation elements. Following the fixated positioning of the focal point over the menu navigation element for a predetermined amount of time, a process corresponding to the menu navigation element is executed.

18 Claims, 5 Drawing Sheets

Related U.S. Application Data

(60) Provisional application No. 61/931,582, filed on Jan. 25, 2014.

(51) Int. Cl.
*G02B 27/01* (2006.01)
*G06F 3/0482* (2013.01)
*G06F 3/0346* (2013.01)

(52) U.S. Cl.
CPC ......... *G02B 27/0179* (2013.01); *G06F 3/012* (2013.01); *G06F 3/0346* (2013.01); *G06F 3/0482* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 5,757,358 A | 5/1998 | Osga | |
| 5,982,555 A | 11/1999 | Melville et al. | |
| 6,084,979 A | 7/2000 | Kanade et al. | |
| 6,151,060 A * | 11/2000 | Tabata | H04N 13/398 348/51 |
| 6,152,563 A | 11/2000 | Hutchinson et al. | |
| 6,175,352 B1 * | 1/2001 | Kay | G09G 3/3674 345/100 |
| 6,184,847 B1 | 2/2001 | Fateh et al. | |
| 6,282,362 B1 | 8/2001 | Murphy et al. | |
| 6,315,273 B1 * | 11/2001 | Davies | B01D 53/18 261/126 |
| 6,415,316 B1 | 7/2002 | Van Der Meer | |
| 7,298,378 B1 | 11/2007 | Hagenbuch et al. | |
| 7,667,700 B1 | 2/2010 | Neely et al. | |
| 7,933,395 B1 | 4/2011 | Bailly et al. | |
| 7,949,642 B2 | 5/2011 | Yang et al. | |
| 7,970,240 B1 | 6/2011 | Chao et al. | |
| 8,803,912 B1 | 8/2014 | Fouts | |
| 9,007,301 B1 * | 4/2015 | Raffle | G09G 3/003 345/156 |
| 9,043,325 B1 | 5/2015 | Moczydlowski | |
| 9,096,920 B1 * | 8/2015 | Gomez | C23C 4/06 |
| 9,213,185 B1 * | 12/2015 | Starner | G02B 27/017 |
| 9,240,014 B1 | 1/2016 | Hoffman et al. | |
| 9,254,438 B2 | 2/2016 | Finn et al. | |
| 9,256,347 B2 | 2/2016 | Finn et al. | |
| 9,261,959 B1 * | 2/2016 | D'Amico | G06F 3/013 |
| 9,318,026 B2 | 4/2016 | Peters et al. | |
| 9,437,159 B2 | 9/2016 | Moravetz | |
| 9,472,014 B2 | 10/2016 | Chan et al. | |
| 9,521,368 B1 | 12/2016 | Cronin | |
| 9,555,334 B2 | 1/2017 | Bernard et al. | |
| 9,588,343 B2 | 3/2017 | Cronin | |
| 9,669,296 B1 | 6/2017 | Hibbert et al. | |
| 9,710,873 B1 | 7/2017 | Hill | |
| 9,818,230 B2 | 11/2017 | Moravetz | |
| 9,838,506 B1 | 12/2017 | Cronin | |
| 9,986,207 B2 | 5/2018 | Cronin | |
| 10,096,167 B2 | 10/2018 | Moravetz | |
| 10,216,738 B1 | 2/2019 | Cronin | |
| 10,320,946 B2 | 6/2019 | Cronin | |
| 10,356,215 B1 | 7/2019 | Cronin | |
| 10,474,711 B1 | 11/2019 | Cronin | |
| 10,565,249 B1 | 2/2020 | Cronin | |
| 10,599,707 B1 | 3/2020 | Cronin | |
| 2002/0038456 A1 | 3/2002 | Hansen et al. | |
| 2002/0083134 A1 | 6/2002 | Bauer et al. | |
| 2004/0111332 A1 * | 6/2004 | Baar | G06F 3/0481 705/50 |
| 2004/0193441 A1 | 9/2004 | Altieri | |
| 2005/0086612 A1 | 4/2005 | Gettman et al. | |
| 2006/0026170 A1 | 2/2006 | Kreitler et al. | |
| 2006/0028400 A1 | 2/2006 | Lapstun et al. | |
| 2006/0236240 A1 * | 10/2006 | Lebow | G06F 40/166 715/210 |
| 2006/0242680 A1 | 10/2006 | Johnson et al. | |
| 2007/0296646 A1 | 12/2007 | Yamamoto et al. | |
| 2008/0024392 A1 | 1/2008 | Gustafsson et al. | |
| 2008/0155019 A1 | 6/2008 | Wallace et al. | |
| 2008/0221843 A1 | 9/2008 | Shenkar et al. | |
| 2008/0306817 A1 | 12/2008 | Amidon et al. | |
| 2009/0005961 A1 | 1/2009 | Grabowski et al. | |
| 2009/0106672 A1 | 4/2009 | Burstrom | |
| 2009/0112469 A1 * | 4/2009 | Lapidot | G01C 23/00 701/469 |
| 2009/0113349 A1 | 4/2009 | Zohar et al. | |
| 2009/0271436 A1 | 10/2009 | Reisinger | |
| 2010/0017728 A1 | 1/2010 | Cho et al. | |
| 2010/0026718 A1 * | 2/2010 | Jetha | G06F 3/0481 345/647 |
| 2010/0083169 A1 | 4/2010 | Athsani et al. | |
| 2010/0088632 A1 | 4/2010 | Knowles et al. | |
| 2010/0102476 A1 | 4/2010 | Higgins | |
| 2010/0231706 A1 | 9/2010 | Maguire | |
| 2010/0238161 A1 | 9/2010 | Varga et al. | |
| 2010/0259471 A1 | 10/2010 | Takano et al. | |
| 2010/0262933 A1 | 10/2010 | Kim et al. | |
| 2011/0043530 A1 | 2/2011 | Nozuki | |
| 2011/0055727 A1 | 3/2011 | Dawson et al. | |
| 2011/0087350 A1 | 4/2011 | Fogel et al. | |
| 2011/0214071 A1 | 9/2011 | Zyda et al. | |
| 2011/0219291 A1 | 9/2011 | Lisa | |
| 2011/0267419 A1 | 11/2011 | Quinn et al. | |
| 2011/0301760 A1 | 12/2011 | Shuster et al. | |
| 2011/0313779 A1 | 12/2011 | Herzog et al. | |
| 2012/0050257 A1 | 3/2012 | Clarke | |
| 2012/0059941 A1 | 3/2012 | Cabasse et al. | |
| 2012/0086727 A1 | 4/2012 | Korah et al. | |
| 2012/0113092 A1 * | 5/2012 | Bar-Zeev | G02B 27/017 345/419 |
| 2012/0127062 A1 * | 5/2012 | Bar-Zeev | G02B 3/14 345/6 |
| 2012/0154277 A1 | 6/2012 | Bar-zeev et al. | |
| 2012/0154557 A1 * | 6/2012 | Perez | H04N 21/25891 348/53 |
| 2012/0194418 A1 * | 8/2012 | Osterhout | G02B 27/0093 345/156 |
| 2012/0194552 A1 * | 8/2012 | Osterhout | G02B 27/0093 345/633 |
| 2012/0249480 A1 * | 10/2012 | Keenan | G06F 3/0428 345/175 |
| 2012/0249741 A1 | 10/2012 | Maciocci et al. | |
| 2012/0289147 A1 | 11/2012 | Raleigh et al. | |
| 2012/0311043 A1 | 12/2012 | Chen et al. | |
| 2013/0007668 A1 | 1/2013 | Liu et al. | |
| 2013/0021373 A1 | 1/2013 | Vaught et al. | |
| 2013/0057550 A1 | 3/2013 | Kishikawa et al. | |
| 2013/0069787 A1 | 3/2013 | Petrou | |
| 2013/0083009 A1 | 4/2013 | Geisner et al. | |
| 2013/0083063 A1 | 4/2013 | Geisner et al. | |
| 2013/0106674 A1 | 5/2013 | Wheeler et al. | |
| 2013/0120224 A1 | 5/2013 | Cajigas et al. | |
| 2013/0125066 A1 | 5/2013 | Klein et al. | |
| 2013/0182891 A1 | 7/2013 | Ling | |
| 2013/0191178 A1 | 7/2013 | Thompson et al. | |
| 2013/0194389 A1 * | 8/2013 | Vaught | G02B 27/017 348/47 |
| 2013/0226528 A1 | 8/2013 | Hodgins et al. | |
| 2013/0227017 A1 | 8/2013 | Gahlings | |
| 2013/0241805 A1 * | 9/2013 | Gomez | G09G 3/003 345/8 |
| 2013/0246967 A1 * | 9/2013 | Wheeler | G06F 3/012 715/784 |
| 2013/0263016 A1 | 10/2013 | Lehtiniemi et al. | |
| 2013/0278531 A1 | 10/2013 | Pisaris-Henderson | |
| 2013/0293468 A1 * | 11/2013 | Perez | G06F 3/033 345/158 |
| 2013/0321265 A1 | 12/2013 | Bychkov et al. | |
| 2013/0335301 A1 * | 12/2013 | Wong | G02B 27/0093 345/8 |
| 2013/0335303 A1 | 12/2013 | Maciocci et al. | |
| 2013/0335447 A1 | 12/2013 | Lu et al. | |
| 2013/0336629 A1 | 12/2013 | Mulholland et al. | |

(56) References Cited

U.S. PATENT DOCUMENTS

| | | |
|---|---|---|
| 2014/0063054 A1 | 3/2014 | Osterhout et al. |
| 2014/0063055 A1 | 3/2014 | Osterhout et al. |
| 2014/0101608 A1* | 4/2014 | Ryskamp .............. G06F 3/0482 715/810 |
| 2014/0164921 A1 | 6/2014 | Salinas |
| 2014/0172906 A1 | 6/2014 | Sud et al. |
| 2014/0229850 A1 | 8/2014 | Makofsky et al. |
| 2014/0267581 A1 | 9/2014 | Cronin |
| 2014/0280502 A1 | 9/2014 | Cronin |
| 2014/0280503 A1 | 9/2014 | Cronin |
| 2014/0280504 A1 | 9/2014 | Cronin |
| 2014/0280505 A1 | 9/2014 | Cronin |
| 2014/0280506 A1 | 9/2014 | Cronin |
| 2014/0280644 A1 | 9/2014 | Cronin |
| 2014/0282113 A1 | 9/2014 | Cronin |
| 2014/0310643 A1 | 10/2014 | Karmanenko et al. |
| 2015/0007114 A1* | 1/2015 | Poulos .................... G06F 3/012 715/852 |
| 2015/0009132 A1 | 1/2015 | Kuriya et al. |
| 2015/0062114 A1 | 3/2015 | Ofstad |
| 2015/0212322 A1 | 7/2015 | Moravetz |
| 2015/0213778 A1 | 7/2015 | Moravetz |
| 2017/0004654 A1 | 1/2017 | Moravetz |
| 2017/0090460 A1 | 3/2017 | Andrew et al. |
| 2017/0150103 A1 | 5/2017 | Cronin |
| 2018/0082483 A1 | 3/2018 | Moravetz |
| 2018/0097915 A1 | 4/2018 | Cronin |
| 2019/0297172 A1 | 9/2019 | Cronin |
| 2019/0306276 A1 | 10/2019 | Cronin |

FOREIGN PATENT DOCUMENTS

| | | |
|---|---|---|
| EP | 1 679 577 | 7/2006 |
| EP | 2 378 781 | 10/2011 |
| JP | H10-222287 | 8/1998 |
| JP | H11-095971 | 4/1999 |
| JP | 2003-280805 | 10/2003 |
| JP | 2011-228859 | 11/2011 |
| JP | 2013-168910 | 8/2013 |
| JP | 2013-258614 | 12/2013 |
| JP | 2018-190429 | 11/2018 |
| KR | 10-2011-0094693 | 8/2011 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

U.S. Appl. No. 14/460,279 Office Action dated Jun. 15, 2017.
Japanese Patent Application 2016-546976 Non-Final Notification of Reason(s) for Refusal dated Jul. 31, 2018.
U.S. Appl. No. 14/460,273 Final Office Action dated Oct. 12, 2018.
U.S. Appl. No. 14/460,276 Final Office Action dated Oct. 15, 2018.
U.S. Appl. No. 15/832,022 Office Action dated Sep. 7, 2018.
U.S. Appl. No. 14/460,280 Final Office Action dated Oct. 30, 2018.
U.S. Appl. No. 14/460,272, John Cronin, Personal Digital Assistance and Virtual Reality, filed Aug. 14, 2014.
U.S. Appl. No. 14/460,273, John Cronin, Real Time Unified Communications Interaction of a Predefined Location in a Virtual Reality Location, filed Aug. 14, 2014.
U.S. Appl. No. 14/460,275, John Cronin, Crowd and Cloud Enabled Virtual Reality Distributed Location Network, filed Aug. 14, 2014.
U.S. Appl. No. 14/460,276, John Cronin, System and Methods for Effective Virtual Reality Visitor Interface, filed Aug. 14, 2014.
U.S. Appl. No. 14/460,277, John Cronin, Virtual Reality Universe Representation Changes Viewing Based Upon Client Side Parameters, filed Aug. 14, 2014.
U.S. Appl. No. 14/460,279, John Cronin, Virtual Reality Interaction With 3D Printing, filed Aug. 14, 2014.
U.S. Appl. No. 14/460,280, John Cronin, Virtual Reality Enhanced Through Browser Connections, filed Aug. 14, 2014.
U.S. Appl. No. 15/377,288, John Cronin, Real Time Virtual Reality Leveraging Web Cams and IP Cams and Web Cam And IP Cam Networks, filed Dec. 13, 2016.
European Patent Application 15740676.0 Extended European Search Report dated Jul. 6, 2017.
Japanese Patent Application 2016-546976 Decision for Refusal dated Jul. 18, 2017.
Japanese Patent Application 2016-548227 Notification of Reason(s) for Refusal dated Jul. 18, 2017.
U.S. Appl. No. 14/460,272 Office Action dated Jul. 5, 2017.
U.S. Appl. No. 14/460,272 Final Office Action dated Feb. 22, 2018.
Hollerer, T., et al., "User interface management techniques for collaborative mobile augmented reality", Computers and Graphics, 25(5):799-810, Dec. 2001.
Chinese Patent Application 2015-80005815.1 First Office Action dated Oct. 30, 2017.
Russian Patent Application No. 2016134268 Office Action dated Oct. 18, 2017.
Russian Patent Application No. 2016134268 Search Report dated Sep. 25, 2017.
Russian Patent Application No. 2016134577 Office Action dated Aug. 18, 2017.
Russian Patent Application No. 2016134577 Search Report dated Aug. 18, 2017.
U.S. Appl. No. 15/813,032 Office Action dated Jan. 24, 2018.
U.S. Appl. No. 14/460,279 Final Office Action dated Feb. 1, 2018.
U.S. Appl. No. 14/460,273 Office Action dated May 24, 2018.
U.S. Appl. No. 14/460,275 Office Action dated Aug. 6, 2018.
U.S. Appl. No. 14/460,276 Office Action dated May 8, 2018.
U.S. Appl. No. 14/460,280 Office Action dated Jun. 14, 2018.
A Quality of Experience Model for Haptic Virtual Environments; Hamam et al., ACM Transaction on Multimedia Computing, Communications and Applications, vol. 10, No. 3, Article 28, pp. 1-23, Apr. 2014.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 14/283,083 Office Action dated Sep. 30, 2015.
U.S. Appl. No. 15/239,382 Office Action dated Mar. 9, 2017.
U.S. Appl. No. 14/460,272 Office Action dated Aug. 3, 2016.
U.S. Appl. No. 14/460,272 Office Action dated Jan. 14, 2016.
U.S. Appl. No. 14/460,275 Office Action dated Apr. 13, 2017.
U.S. Appl. No. 14/460,276 Office Action dated Apr. 13, 2017.
U.S. Appl. No. 14/460,277 Office Action dated Sep. 1, 2016.
U.S. Appl. No. 14/460,280 Office Action dated Apr. 18, 2017.
U.S. Appl. No. 14/460,281 Final Office Action dated Feb. 29, 2016.
U.S. Appl. No. 14/460,281 Office Action dated Oct. 8, 2015.
Japanese Patent Application 2016-546976 Notification of Reason(s) for Refusal dated Feb. 7, 2017.
U.S. Appl. No. 15/813,032, Justin Moravetz, Method for Executing functions in a VR Environment.
U.S. Appl. No. 15/832,022, John Cronin, Virtual Reality Universe Representation Changes Viewing Based Upon Client Side Parameters, filed Dec. 5, 2017.
Chinese Patent Application No. 2015-80005727.1 Second Office Action dated Dec. 11, 2018.
Chinese Patent Application No. 2015-80005727.1 Search Report dated Dec. 11, 2018.
Japanese Patent Application No. 2016-546976 Final Notification of Reason(s) for Refusal dated Jan. 22, 2019.
U.S. Appl. No. 14/460,273 Final Office Action dated Nov. 2, 2017.
U.S. Appl. No. 14/460,275 Final Office Action dated Nov. 8, 2017.
U.S. Appl. No. 14/460,276 Final Office Action dated Nov. 9, 2017.
U.S. Appl. No. 14/460,280 Final Office Action dated Nov. 9, 2017.
U.S. Appl. No. 14/460,272 Office Action dated Apr. 18, 2019.
U.S. Appl. No. 14/460,273 Office Action dated May 15, 2019.
U.S. Appl. No. 16/438,344, John Cronin, Virtual Reality Universe Representation Changes Viewing Based Upon Client Side Parameters, filed Jun. 11, 2019.
Japanese Patent Application 2018-108517 Non-Final Notification of Reason(s) for Refusal dated Apr. 16, 2019.

(56) References Cited

OTHER PUBLICATIONS

U.S. Appl. No. 14/460,272 Final Office Action dated Nov. 27, 2019.
Chinese Patent Application No. 2015-80005727.1 Third Office Action dated Jun. 13, 2019.
Chinese Patent Application No. 2015-80005727.1 Search Report dated Jun. 13, 2019.
U.S. Appl. No. 14/460,272 Office Action dated Jun. 2, 2020.
U.S. Appl. No. 16/445,008 Office Action dated Mar. 23, 2020.
U.S. Appl. No. 16/792,793, John Cronin, Real Time Unified Communications Interaction of a Predefined Location in a Virtual Reality Location, dated Feb. 17, 2020.
Brazilian Patent Application No. BR1120160171810 Preliminary Office Action dated Apr. 28, 2020.
U.S. Appl. No. 16/792,793 Office Action dated Jul. 23, 2020.

\* cited by examiner

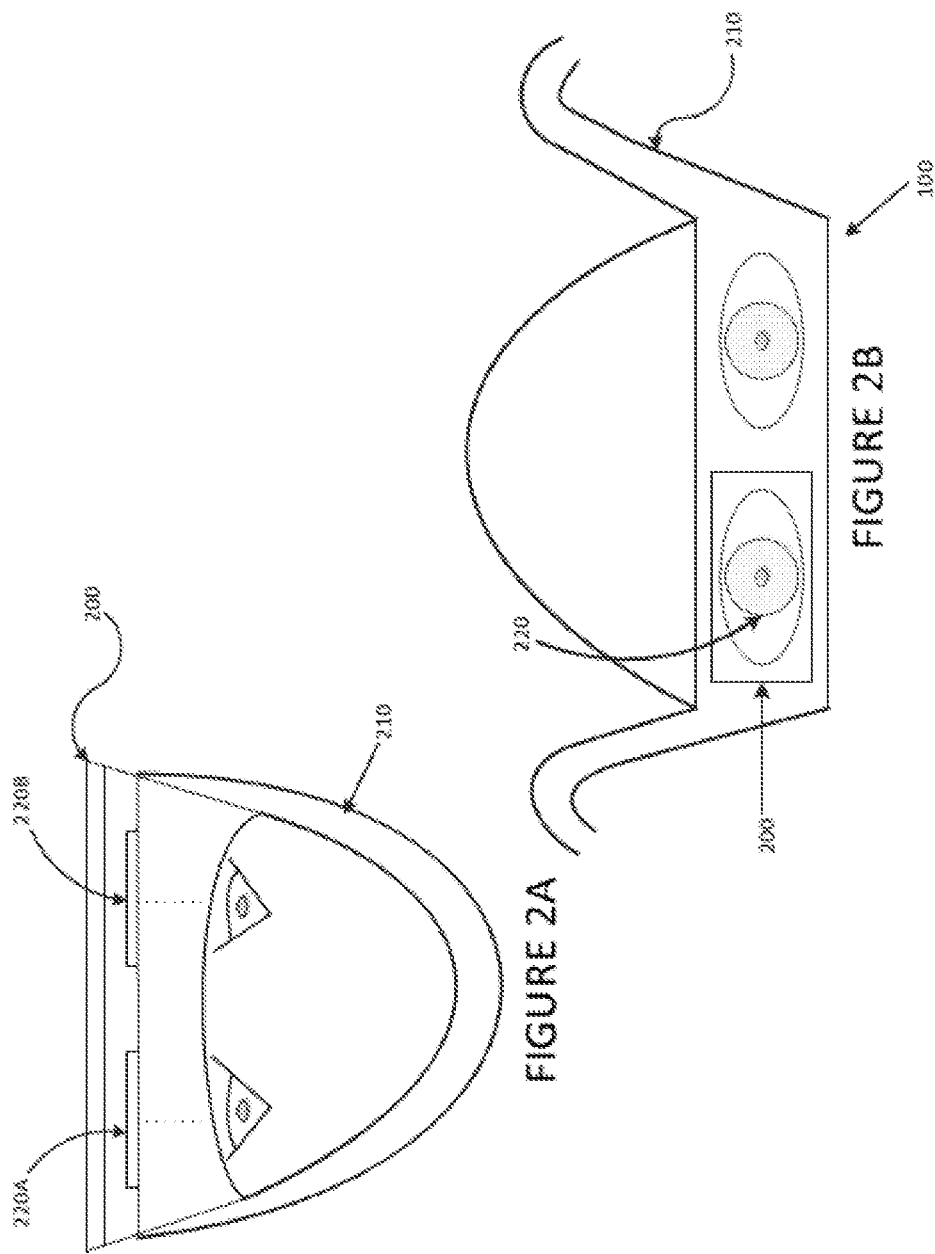

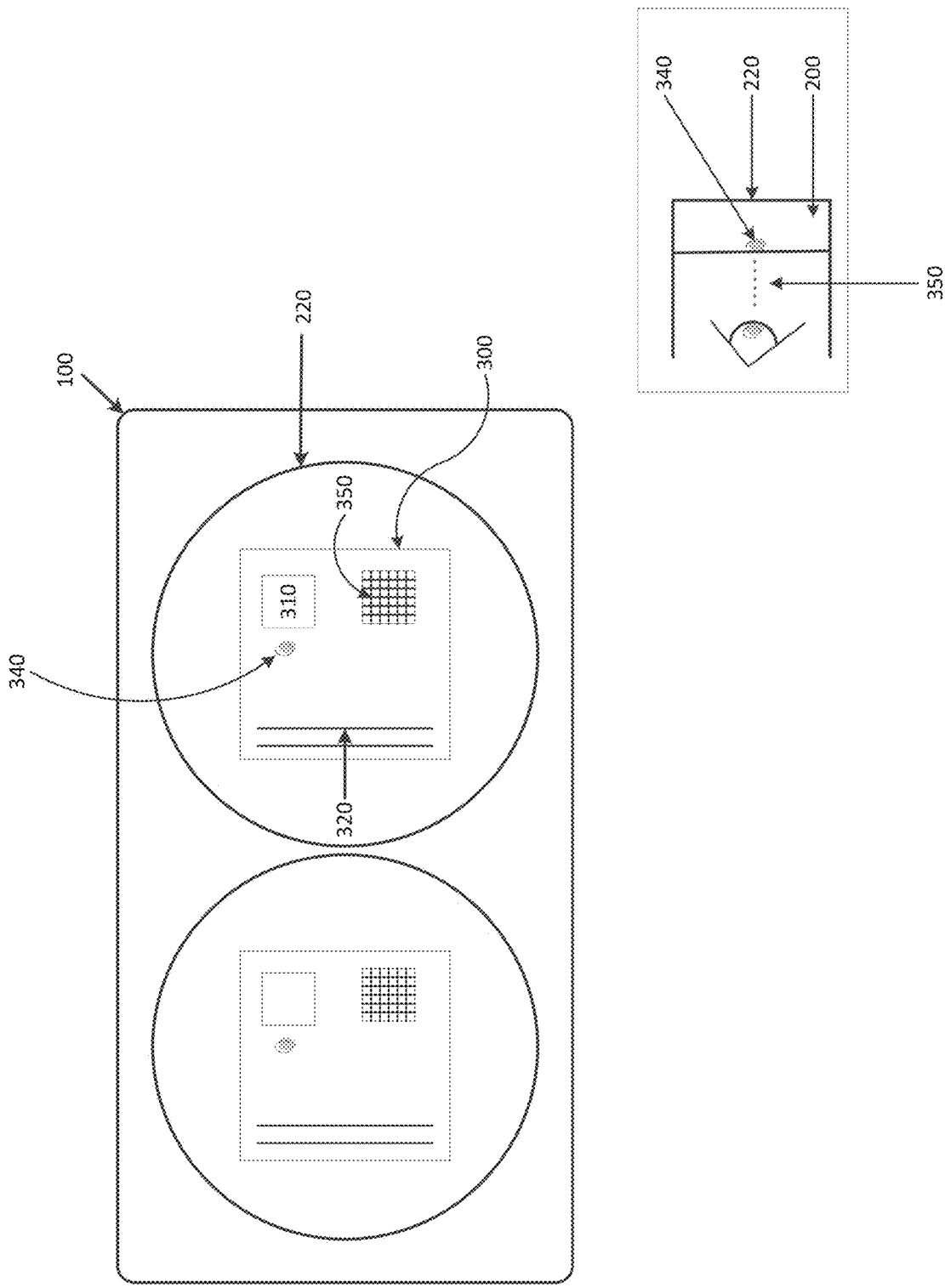

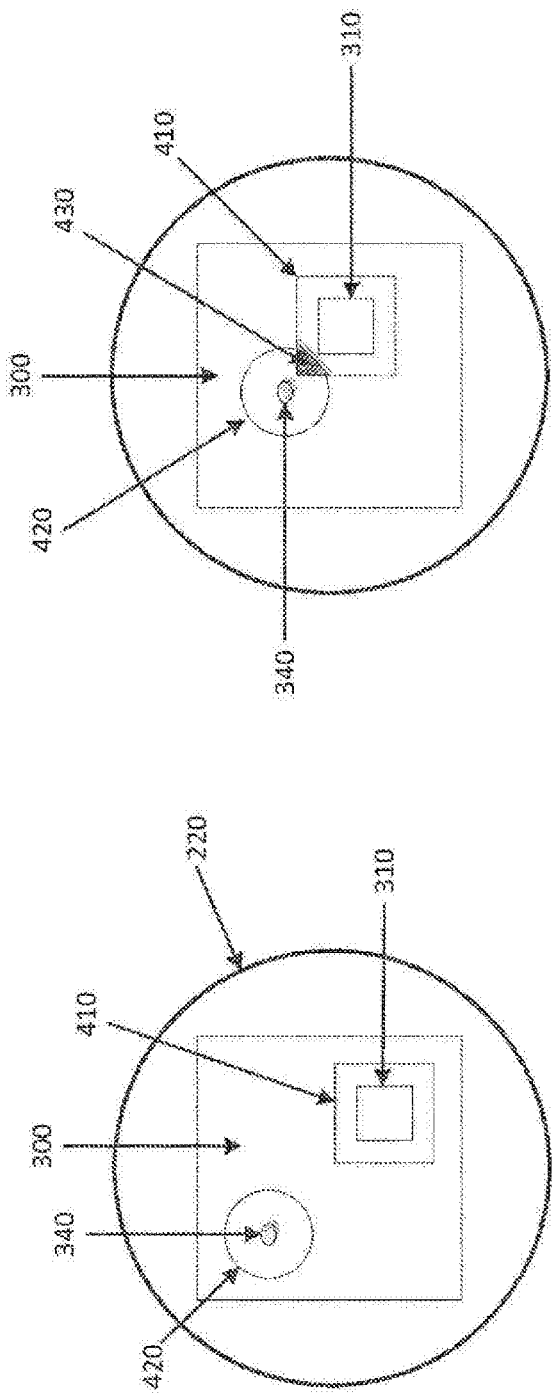
FIGURE 4A
FIGURE 4B
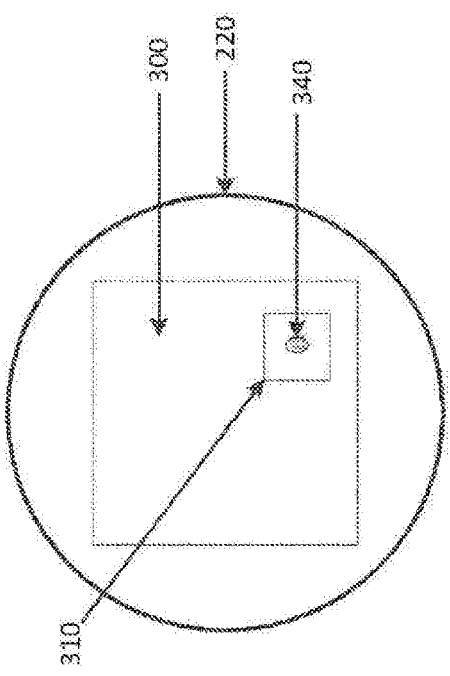
FIGURE 4C

MENU NAVIGATION IN A HEAD-MOUNTED DISPLAY

CROSS-REFERENCE TO RELATED APPLICATIONS

The present application is a continuation and claims the priority benefit of U.S. patent application Ser. No. 14/283,032 filed May 20, 2014, issuing as U.S. Pat. No. 9,588,343, which claims the priority benefit of U.S. provisional patent application No. 61/931,582 filed Jan. 25, 2014, the disclosures of which are incorporated herein by reference.

BACKGROUND OF THE INVENTION

Field of Invention

The present invention generally relates to wearable virtual reality (VR) computing devices having a head-mounted display (HMD). More specifically, the present invention relates to utilizing the field of view in the HMD to implement menu control functionality.

Description of the Related Art

Wearable VR systems integrate various elements such as input devices, sensors, detectors, image displays, and wireless communication components as well as image and audio processors. By placing an image display element close to the eyes of a wearer, an artificial image can be made to overlay the view of the real world or to create an independent reality all its own. Such image display elements are incorporated into systems also referred to as head-mounted displays (HMDs). Depending upon the size of the display element and the distance to the eyes of the wearer, artificial images provided on the display may fill or nearly fill the field of view of the wearer.

VR systems incorporating an HMD are mobile and lightweight while allowing for communication and interaction with a virtual environment. Such systems are generally lacking, however, in that they still require use of an independent controller for navigation of the virtual environment. In this sense, most HMDs are little more than goggles allowing for entry into a VR environment. There is a need in the art for navigation and control of a VR environment without introducing an independent controller device.

SUMMARY OF THE CLAIMED INVENTION

Embodiments of the present invention include systems and methods for menu navigation in a head-mounted display. Positional data related to the head-mounted display may be generated. The position of a focal point may be tracked. The focal point may be determined to be within an operational range of a menu navigation element. A fixation timer that corresponds to the navigation element may be executed to count down a predetermined period of time when the focal point is determined to be within the operational range of the menu navigation element. Upon expiration of the predetermined period of time, a function corresponding to the navigation element may be implemented.

Methods for menu navigation in a head-mounted display may be provided. Such methods may include generating positional data of the head-mounted display via a sensor, tracking a position of a focal point of the head-mounted display within a virtual environment that includes a menu navigation element, determining that the focal point is within an operational range of the menu navigation element, executing a fixation timer corresponding to the navigation element that counts down a predetermined amount of time when the focal point is within the operational range of the menu navigation element, and implementing a corresponding function of the navigation element when the predetermined amount of time has expired.

Systems for menu navigation in a head-mounted display may include at least one of a gyroscope, magnetometer, and an accelerometer that generate positional data, a head-mounted display including at least one lens to display a focal point in a virtual environment that includes a menu navigation element, and a processor that executes instructions stored in memory to process the positional data to track the position of the focal point within the virtual environment, to determine that the focal point is within an operational range of the menu navigation element, to execute a fixation timer corresponding to the navigation element that counts down a predetermined amount of time when the focal point is within the operational range of the menu navigation element, and to execute a functionality associated with the menu navigation element upon expiration of the predetermined amount of time as indicated by the fixation timer.

Additional embodiments of the present invention provides a non-transitory computer-readable storage medium having embodied thereon a program. The program is executable by a processor to perform a method for menu navigation in a head-mounted display. The method includes generating positional data, tracking the position of a focal point and determining that the focal point is within an operational range of a menu navigation element. A fixation timer is that corresponds to the navigation element is executed. A corresponding function of the navigation element is implemented when the fixation timer expires.

BRIEF DESCRIPTION OF THE DRAWINGS

FIG. 2A illustrates an HMD that completely immerses a wearer in a virtual reality environment.

FIG. 2B illustrates an HMD that allows for generation of VR information while maintaining perception of the real world.

FIG. 3 illustrates an exemplary navigation menu displayed on lens display of HMD.

FIG. 4A illustrates the use of focal point to effectuate a visual element in a navigation menu whereby the corresponding operation of a virtual button has not been activated.

FIG. 4B illustrates the use of focal point to effectuate a visual element in a navigation menu whereby a region associated with the focal point and virtual button are activating a corresponding function.

FIG. 4C illustrates the use of focal point to effectuate a visual element in a navigation menu whereby the focal point is directly activating a corresponding function of a virtual button.

DETAILED DESCRIPTION

Embodiments of the present invention include systems and methods for menu navigation in a head-mounted display. Positional data related to the head-mounted display may be generated. The position of a focal point may be tracked. The focal point may be determined to be within an operational range of a menu navigation element. A fixation timer that corresponds to the navigation element may be executed to count down a predetermined period of time when the focal point is determined to be within the operational range of the menu navigation element. Upon expiration of the predetermined period of time, a function corresponding to the navigation element may be implemented.

Figure 1:
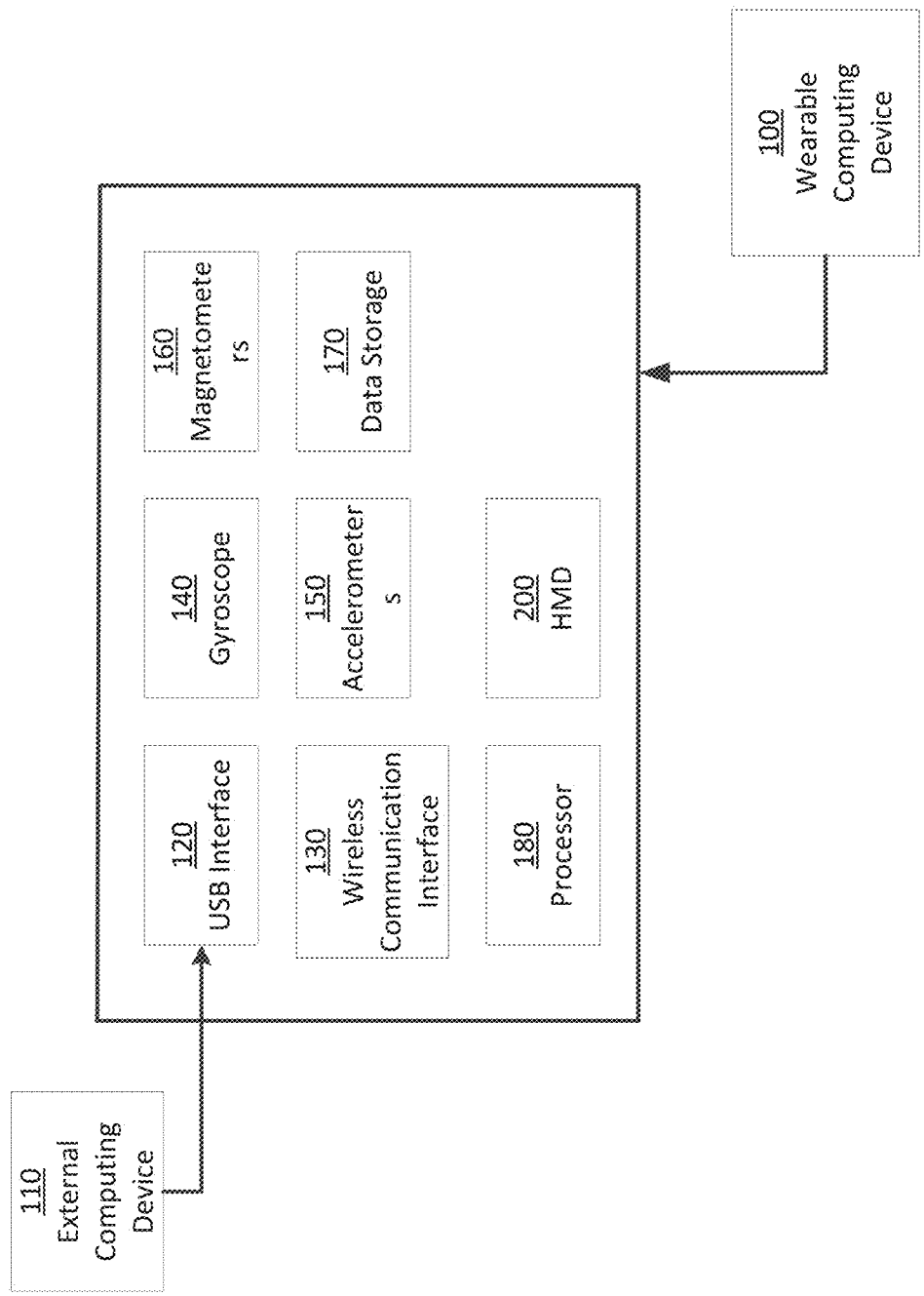
FIG. 1 illustrates a block diagram of an exemplary wearable computing device.

FIG. 1 illustrates a block diagram of an exemplary wearable virtual reality system 100. In communication with an external computing device 110, wearable virtual reality system 100 may include a USB interface 120, wireless communication interface 130, gyroscope 140, accelerometer 150, magnetometer 160, data storage 170, processor 180, and head-mounted display (HMD) 200.

Head-mounted display (HMD) 200 allows its wearer to observe real-world surroundings, a displayed computer generated image, or a combination of the two. HMD 200 may include a see-through display in some embodiments. The wearer of wearable co virtual reality system 100 may be able to look through HMD 200 in such an embodiment and observe a portion of the real-world environment notwithstanding the presence of the wearable virtual reality system 100. HMD 200 in a further embodiment may be operable to display images that are superimposed on the field of view to provide an "augmented reality" experience. Some of the images displayed by HMD 200 may be superimposed or appear in relation to particular objects in the field of view. In a still further embodiment, HMD 200 may be a completely virtual environment whereby the wearer of the wearable virtual reality system 100 is isolated from any visual contact with the real world.

The displayed image may include graphics, text, and/or video; audio may be provided through a corresponding audio device. The images displayed by the HMD may be part of an interactive user interface and include menus, selection boxes, navigation icons, or other user interface features that enable the wearer to invoke functions of the wearable computing device or otherwise interact with the wearable computing device. The form factor of HMD 200 may be that of eyeglasses, goggles, a helmet, a hat, a visor, a headband, or in some other form that can be supported on or from the head of the wearer.

To display a virtual image to the wearer, the HMD may include an optical system with a light source such as a light-emitting diode (LED) that illuminates a display panel. The display panel may encompass a liquid crystal display panel (LCD). The display panel may generate light patterns by spatially modulating the light from the light source, and an image former forms a virtual image from the light pattern. Alternatively, the panel may be liquid crystal on silicon (LCOS) whereby a liquid crystal layer may be situated on top of a silicon backplane.

The HMD in an exemplary embodiment includes a 7 inch screen with non-overlapping stereoscopic 3D images whereby the left eye sees extra area to the left and the right eye sees extra area to the right. The HMD attempts to mimic normal human vision, which is not 100% overlapping. The field of view in an exemplary embodiment is more than 90 degrees horizontal (110 degrees diagonal) thereby filling approximately the entire field of view of the view such that the real world may be completely blocked out to create a strong sense of immersion.

An embodiment may utilize 1280×800 (16:10 aspect ratio) thereby allowing for an effective of 640×800, 4:5 aspect ratio per eye. In an embodiment that does not allow for complete overlap between the eyes, the combined horizontal resolution is effectively greater than 640. The displayed image for each eye is pin cushioned thereby generating a spherical-mapped image for each eye.

HMD 200 may communicate with external computing device(s) 110. External computing device(s) 110 are inclusive of application servers, databases, and other external computing components known in the art, including standard hardware computing components such as network and media interfaces, non-transitory computer-readable storage (memory), and processors for executing instructions or accessing information that may be stored in memory.

Wearable virtual reality system 100 may in some instances be physically connected to external computing device(s) 110. Such a connection may be implemented by way of a USB interface 120, which may be used to send data to and receive data from an external computing device 110 by way of a USB-compliant cabling. USB interface 120 may also be used to power the wearable virtual reality system 100 thereby potentially negating the need for an external power supply and any power cabling associated with the same. In some instances, a further power adapter (not shown) may be necessary to implement power by way of the USB interface 120. It should be understand that reference to USB is exemplary as other types of interfaces may be used including but not limited to FireWire, Lightning, as well as other cabled connection standards such as HDMI and DVI.

Wearable virtual reality system 100 of FIG. 1 includes a wireless communication interface 130. Wireless communication interface 130 may be used for wirelessly communicating with external computing device(s) 110. Wireless communication interface 130 may also be used for communicating with other wearable computing devices 100. Wireless communication interface 130 may utilize any number of wireless communication standards that support bi-directional data exchange over a packet-based network such as the Internet. Exemplary communication standards include CDMA, GSM/GPRS, 4G cellular, WiMAX, LTE, and 802.11 (WiFi).

Wearable virtual reality system 100 may include one or more of three-dimensional axis gyroscopes 140, accelerometers 150, and magnetometers 160 Gyroscope 140 may be utilized to measure orientation based on the principles of angular momentum. Accelerometer 150 may be used to detect magnitude and direction of acceleration as a vector quantity. This result can be used to sense orientation because direction of weight changes, coordinate acceleration correlated to g-force or a change in g-force, and vibration, shock, and falling in a resistive medium by way of a change in proper acceleration. Magnetometers 160 may be used to identify disturbances in a magnetic field relative the wearable virtual reality system 100. Magnetometer 160 can assist in the identification of true north for GPS and compass applications as well as assist with touchless or camera-less gesture input. By utilizing data generated from the foregoing, absolute head orientation tracking without drift relative to the earth may be calculated. Latency tracking may operate at approximately 1000 Hz to decrease response time and increase perceived realism. The displays of wearable virtual reality system 100 may be adjusted to allow the individual displays to be moved further or closer to the eyes of the wearer.

Wearable virtual reality system 100 may operate by way of the execution of non-transitory computer readable instructions stored in data storage 170, where execution occurs through operation of processor 180. While FIG. 1 illustrates data storage 170 and processor 180 as being present at wearable virtual reality system 100, such elements may be located in external computing device(s) 110 or in some instances, with executable operations distributed between the two. Processor 180 and executable instructions at data storage 170 may also control various aspects of USB interface 120, wireless interface 130, gyroscopes 140, accelerometers 150, and magnetometers 160.

FIG. 2A illustrates an HMD 200 that completely immerses a wearer in a virtual reality environment. While FIG. 2A is illustrated as immersive goggles, other form factors are possible and envisioned. The operation of elements in FIG. 2A are the same as those discussed in the context of FIG. 2B. FIG. 2A includes head-mounted support 210 that allows for wearable virtual reality system 100 (including HMD 200) to be positioned on the head of a wearer. HMD 200 further includes lens displays 220A and 220B that may be of LCD or LCOS construction as described above. Lens displays 220A and 220B may be an integrated part of wearable virtual reality system 100.

The manufacture of wearable virtual reality system 100 may allow for integration of components like those illustrated in FIG. 1 and various component interconnects to be internally integrated. Other components may be situated on the exterior of wearable virtual reality system 100 to allow for more ready access or physical connections to external computing device(s) 110. An embodiment of wearable virtual reality system 100 may include a microphone to allow for voice communication with other individuals utilizing wearable virtual reality system 100 or to allow for certain hands free control of the system 100.

FIG. 2B illustrates an HMD 200 that allows for generation of virtual reality information while maintaining perception of the real world. Such dual perception is provided for by not completely immersing the wearer within the confines of the virtual environment (i.e., the real world can still be seen and perceived). While HMD 200 of FIG. 2B is illustrated as a simple band other form factors are possible and envisioned. The operation of elements on FIG. 2B are the same as those discussed in the context of FIG. 2A.

FIG. 3 illustrates an exemplary navigation menu 300 displayed on lens display 200 of HMD 200. Navigation menu 300 may include any variety of visual elements including virtual buttons 310, scroll bars 320, keys 330, or any other known elements for receiving input from a user. The navigation menu 300 may be defined in terms of one or more control instructions for controlling a software application executing on virtual wearable system 100. Particular visual elements of a navigation menu 300, such as a virtual button 310, may be associated with a particular control instruction, so that actuation of the virtual button may result in its associated control instruction be effectuated.

As noted above, wearable virtual reality system 100 includes one or more of axis gyroscopes 140, accelerometers 150, and magnetometers 160. Data generated by one or more of the foregoing components may be translated into selection or manipulation of one or more visual elements from navigation menu 300 and displayed by HMD 200. For example, by way of the user moving their head while wearing wearable virtual reality system 100, a point in space can be identified using the gyroscope 140, accelerometers 150, and magnetometers 160 to create a focal spot 340 in three-dimensional space in a manner similar to a mouse pointer in two-dimensional space that may be generated in the context of a desktop computer. Focal spot or pointer 340 may, but not necessarily, correspond to a line-of-sight 350 from the eye of a user vis-a-vis the lens 220 of HDM 200 (see inset of FIG. 3).

By aligning focus spot 340 over various visual elements of navigation menu 300 and maintaining the positioning of the focal spot/pointer 340 over a particular visual element (e.g., virtual button 310) for a particular period of time, the functionality of the focused-on element may be effectuated. It may not be sufficient for focal point 340 to merely track over a virtual button 310, but instead remain fixated over the virtual button 310 or an area associated with the virtual button 310 for a predefined period of time (e.g., three seconds). The pre-defined period of time may be set by a developer of a software application or controlled through a user preferences option that may be changed in the wearable virtual reality system 100 or the application software by the user of the system 100.

FIGS. 4A-4C illustrates the use of a focal point to effectuate a visual element in a navigation menu. Specifically, FIG. 4A illustrates a focal point 340 not yet fixated on element 310 in a navigation menu. As such, the corresponding operation of a virtual button has not yet been activated. As shown in FIG. 4A, focal point 340 includes an associated area 420 that extends the effect of maintaining focal point 340 over a particular point or area associated with said point. While illustrated as a circle in FIG. 4A, the associated area 420 may also be a square, rectangle, or any other shape or configuration that extends the operative range of the focal point 340. Associated area 420 of focal point 340 may be visible, translucent, or invisible to the user. Associated area 420 in an instance of being visible or translucent may be of a color that sets off the area from the background of the virtual environment displayed on lens 220 such that the user has a clear understanding of the range of focal point 340 and associated area 420.

Virtual button 310 may also have an associated area (410) like that of the focal point 340. Like the focal point 340 and its associated area 420, the area may be of a different shape, size, color, or visibility, or translucency of virtual button 340 or virtual environment as displayed on lens 220 of HMD 200. The associated area 410 of virtual button 310 and the associated area 420 of focal point 340 may each individually be controlled by developer, default, or user settings, which may be changed through a user settings menu (not shown). Controllable functions include shape, size, visibility, translucency, as well as the aforementioned time period of fixation requires to activate the function of virtual menu 300.

FIG. 4B illustrates a region 420 associated with the focal point 420 overlapping with virtual button 410, which effectuates a visual element in a navigation menu 300 and activates a corresponding function of the virtual button 310. Compared to FIG. 4A, FIG. 4B illustrates that the associated regions of focal point 340 and virtual button 310 now overlap as shown in highlighted area 430. While a highlighted area is graphically illustrated in FIG. 4B, this is for ease of illustration. It is not required that a highlighted area 430 appear on lens 220 but this may be a setting available for configuration by user and/or an application developer. Because the associated areas of focal point 340 and virtual button 310 are overlapping, the associating function of the virtual button 310 will be effectuated at the expiration of the pre-defined fixation time, the tolling of which may be controlled by an internal clocking function implemented through the processor-based execution of software responsible for the control of menu 300 and maintained in data storage 170. Such an internal clocking function may be activated to count down from a pre-defined period of time or count up to the pre-defined period of time. Such counting may be set to occur only while there is overlap between focal point 340 and menu navigation element 310 (or associated areas 410 and 420 thereof). As such, if focal point 340 were to move away before the pre-defined period of time has expired, no function may be activated.

FIG. 4C illustrates the use of focal point to effectuate a visual element in a navigation menu whereby the focal point is directly activating a corresponding function of a virtual button. Unlike FIG. 4B, the associated areas 410 and 420 of virtual button 310 and focal point 340 are not being utilized. In FIG. 4C, the focal point 340 is fixated directly over the virtual button 310. At the expiration of the required period of fixation time, the associated function of the button will be implemented.

Figure 5:
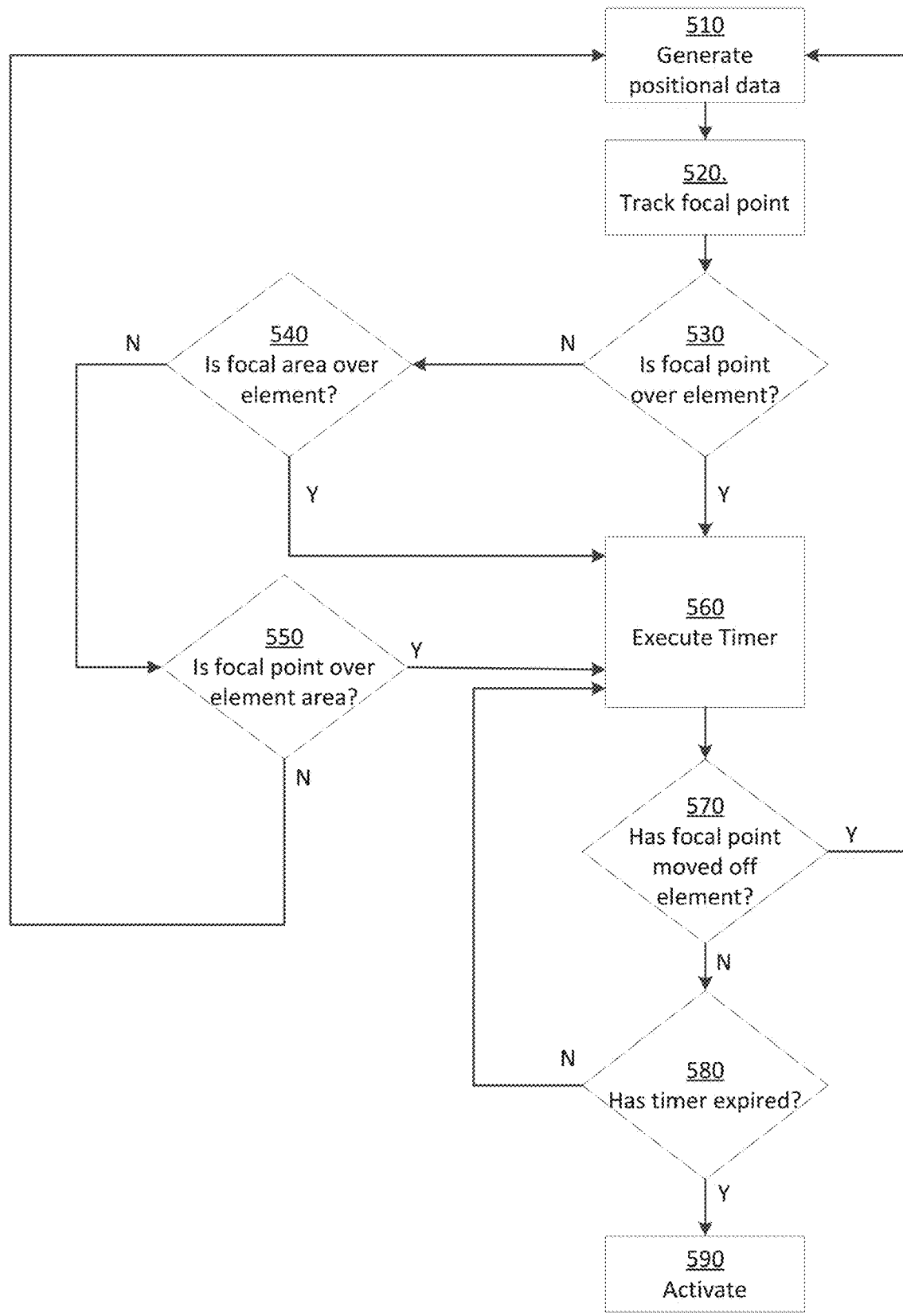
FIG. 5 illustrates an exemplary method for menu selection in a VR environment.

FIG. 5 illustrates an exemplary method 500 for menu selection in a VR environment, which may be effectuated by execution of instructions stored in memory 170 by processor 180. The method 500 of FIG. 5 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 5 (and the order thereof) are exemplary and may include various alternatives, equivalents, or derivations thereof including but not limited to the order of execution of the same.

In step 510, positional data may be generated based on movement of the head of a wearer of the wearable VR system 100. Positional data may be generated by one or more of axis gyroscopes 140, accelerometers 150, and magnetometers 160.

Data generated by one or more of the foregoing components may be translated into positional data of a focus spot or pointer 340 at step 520. That location of the of focus spot or pointer 340 may be displayed in the context of one or more visual elements from navigation menu 300 and displayed by HMD 200.

A determination is made at step 530 as to whether the focus spot or pointer 340 is currently located over a button or other element from a navigation menu 300. If a determination has been made from an analysis of the position of focus spot or pointer 340 that it is not located over an element from navigation menu 300, a further determination is made at step 540 as to whether an area associated with the focus spot or pointer is located over an element from navigation menu 300. If a determination is made that associated area of the focus spot or pointer is not located over an element from the navigation menu in step 540, a still further determination is made at step 550 as to whether an associated area of the focal point overlaps with an associated area of the element. If the determination remains no at step 550—as illustrated in FIG. 4A—then the generation of positional data and tracking of position of the focal point continues at steps 510 and 520, respectively.

If the determination at step 530 is yes (as would correspond to FIG. 4C) or at step 540 (as would correspond to FIG. 4B), then a fixation timer begins to execute at step 560 to decide whether the focal point or its associated area remains over the navigational menu element for the predetermined period of time to invoke any functionality associated with that button or other element. As the timer counts down (or up) to the predetermined fixation time, an concurrent determination is continually made at step 570 as to whether there has been movement of the focal point or its associated area with respect to the navigational menu. If the focal point or associated area has changed such that the determinations of steps 530, 540, or 550 would now register "no," (i.e., movement registers as a 'yes') then the timer stops and the generation of positional data and tracking of the focal point continues at steps 510 and 520, respectively. The change in position prior to expiration of the required fixation time correlates to intent of the user or wearer of system 100 not to invoke any corresponding menu functionality.

If, however, the determination is "no" as to movement of the focal point at step 570, then a still further determination is made at step 580 with respect to expiration of the pre-determined time period at step 580. If the pre-determined period has not yet been counted up or down to, then the loop consisting of steps 560, 570, and 580 continues until expiration of the fixation period has been achieved at which point the corresponding functionality of the menu executes at step 590 and method 500 ends.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for menu navigation in a head-mounted display, the method comprising:
   generating an interactive user interface to display on a head-mounted display, wherein the generated interactive user interface is superimposed over a field of view that corresponds to a real-world environment, wherein the generated interactive user interface comprises one or more visual elements;
   tracking movement of the head-mounted display, wherein tracking the movement of the head-mounted display includes generating positional data via one or more motion-based sensors;

identifying a location of a focal point of the head-mounted display as the head-mounted display is moved, the location of the focal point identified based on the positional data;

defining an associated area extending around the location of the focal point based on a user preference;

detecting that the associated area extending around the focal point overlaps over an associated region surrounding at least one visual element for a pre-determined period of time, wherein the associated region extends an operative range of the at least one visual element beyond the display of the at least one visual element; and executing a function corresponding to the at least one visual element when the associated area extending around the focal point is detected overlapping over the associated region surrounding the at least one visual element for the pre-determined period of time.

2. The method of claim 1, wherein the one or more visual elements includes graphics, text, or video.

3. The method of claim 1, wherein at least one of a shape, size, visibility, and translucency of the associated region, and the pre-determined period of time is customizable.

4. The method of claim 1, further comprising providing a display of a pointer at the identified location of the focal point, and setting off the associated area extending around the focal point from a current background of the field of view.

5. The method of claim 4, wherein a shape, size, visibility, and translucency of the associated area is customizable for the focal point.

6. The method of claim 1, wherein detecting that the identified location of the focal point overlaps the at least one visual element for the pre-determined period of time includes tracking the pre-determined period of time using an internal clock associated with the head-mounted display.

7. The method of claim 1, wherein the one or more visual elements include at least one of menus, selection boxes, or navigation icons.

8. The method of claim 1, wherein the location of the focal point corresponds to a line-of-sight from an eye of a user, and wherein the line-of-sight is captured via a lens associated with the head-mounted display.

9. The method of claim 1, wherein another one of the visual elements corresponds to a different function than the at least one visual element.

10. The method of claim 1, wherein executing the function is based on a control instructions particular to the function.

11. The method of claim 1, further comprising defining the associated region surrounding the display of the at least one visual element based on a user preference.

12. The method of claim 1, wherein identifying the location of the focal point includes translating the positional data generated by the motion-based sensors into positional data of the focal point.

13. The method of claim 1, wherein activating the function is further based on gesture input.

14. The method of claim 1, further comprising changing the pre-determined period of time based on a user preference.

15. The method of claim 1, wherein executing the function includes manipulating the at least one visual element.

16. The method of claim 1, wherein the function corresponding to the at least one visual element is specific to a software application.

17. The method of claim 1, wherein the pre-determined period of time is specific to a software application.

18. A non-transitory computer-readable storage medium, having embodied thereon a program executable by a processor to perform a method for menu navigation in a head-mounted display, the method comprising:

generating an interactive user interface to display on a head-mounted display, wherein the generated interactive user interface is superimposed over a field of view that corresponds to a real-world environment, wherein the generated interactive user interface comprises one or more visual elements;

tracking movement of the head-mounted display, wherein tracking the movement of the head-mounted display includes generating positional data via one or more motion-based sensors;

identifying a location of a focal point of the head-mounted display as the head-mounted display is moved, the location of the focal point identified based on the positional data;

defining an associated area extending around the location of the focal point based on a user preference;

detecting that the associated area extending around the focal point overlaps over an associated region surrounding at least one visual element for a pre-determined period of time, wherein the associated region extends an operative range of the at least one visual element beyond the display of the at least one visual element; and executing a function corresponding to the at least one visual element when the associated area extending around the focal point is detected overlapping over the associated region surrounding the at least one visual element for the pre-determined period of time.

* * * * *